United States Patent Office 2,813,118
Patented Nov. 12, 1957

2,813,118
X-RAY CONTRAST COMPOUNDS

William Galler, Valley Stream, N. Y., assignor to American Cystoscope Makers, Inc., New York, N. Y., a corporation of New York No Drawing. Application July 16, 1953,
Serial No. 368,518

12 Claims. (Cl. 260—501)

The present invention relates to nuclear substituted hydroxy- or amino-derivatives of halo-phenoxy-aliphatic carboxylic acids and halo-phenylamino-aliphatic carboxylic acids.

It is the object of the present invention to provide new chemical compounds which are useful in the radiography of the internal organs, particularly in the urological tract.

Other objects of the invention will be apparent to those skilled in the art upon reading the specification which follows:

The compositions of this invention include water-soluble salts which may be injected intravenously and orally and are collected by the kidney. The radiographs taken using such compounds in the urological tract aid in revealing normal and abnormal structures. These water-soluble salts are readily excreted without increasing the burden upon the kidney. Moreover, these compositions have a low incidence of untoward effects on the patient. In addition to the utilization in the excretion radiography of the kidney, the water-soluble salts may be used in making retrograde pyelographs; and because of this fact, they can be used for radiography of other hollow organs, such as the sinuses. They may be administered intravenously or orally.

The novel chemical compounds of this invention are nuclear substituted hydroxy- or amino-derivatives of halo-phenoxy-aliphatic carboxylic acids or halo-phenylamino-aliphatic carboxylic acids, and their non-toxic, water-soluble salts. The preferred compounds of the invention are those having the following structural formula:

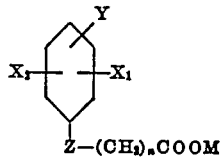

wherein $X_1$ is a member selected from the class consisting of hydrogen, iodine and bromine; $X_2$ is a member selected from the class consisting of bromine and iodine; Y is a member selected from the class consisting of the hydroxyl group, an amino group, mono- and di- lower alkyl substituted amino groups; Z is a member selected from the class consisting of the oxygen atom and the >N—H group; $n$ is an integer from 1 to 5; and M is a member selected from the class consisting of hydrogen, the alkali-metals, the ammonium group, the alkylammonium and alkanolammonium groups. Best results have been obtained with the poly- or diiodo-hydroxyphenoxyacetic acids and their water-soluble salts, particularly the sodium salts. It is more desirable to utilize compounds which are more highly halogenated, and especially those compounds having more than one iodine atom substituted on the benzene ring.

The halogens contemplated in my invention are bromine and iodine, especially the latter.

In the case of the hydroxy- or amino-substituted halophenoxy-aliphatic carboxylic acids, the starting materials for the production of the compounds of this invention are the corresponding hydroxy- or amino-substituted phenoxy-aliphatic carboxylic acids. When it is desired to prepare the hydroxy- or amino-substituted halo-phenylamino-aliphatic carboxylic acids, the desired starting material is the corresponding hydroxy- or amino-substituted phenylamino-aliphatic carboxylic acids. These starting materials are well known to those familiar with this art. The starting material is converted to the desired halogenated compounds of the invention by treatment with an appropriate halogenating agent, such as bromine, or a mixture of iodine and potassium iodide, or preferably such iodination agents as iodine monochloride. The resulting halogenated acids are relatively insoluble in water, but they may be easily converted to the more water-soluble forms by converting the acid to the alkali metal, ammonium, alkylammonium and alkanolammonium salts. In the case of the alkylammonium and alkanolammonium salts, it is preferred that the alkyl substitutent be of the "lower" category, i. e., each group having four carbon atoms or less. Best results to date have been obtained with the sodium salts.

Examples of the halo-hydroxy-phenoxy-aliphatic carboxylic acids are the following or their alkali-metal, ammonium, alkylammonium or alkanolammonium salts, such as their sodium, potassium, methylammonium, n-butylammonium or diethanolammonium salts:

2-hydroxy-5-iodophenoxyacetic acid
3-hydroxy-6-iodophenoxyacetic acid
4-hydroxy-3-iodophenoxyacetic acid
2-hydroxy-3-iodophenoxyacetic acid
3-hydroxy-4-iodophenoxyacetic acid
4-hydroxy-3,5-diiodophenoxyacetic acid
2-hydroxy-3,5-diiodophenoxyacetic acid
3-hydroxy-4,6-diiodophenoxyacetic acid
4-hydroxy-3,5-dibromophenoxyacetic acid
2-hydroxy-3,5-dibromophenoxyacetic acid
3-hydroxy-4,6-dibromophenoxyacetic acid
2-hydroxy-5-bromophenoxyacetic acid Examples of the halo-hydroxy-phenylamino-aliphatic carboxylic acids in accordance with my invention are:

2-hydroxy-5-iodophenylglycine
3-hydroxy-6-iodophenylglycine
4-hydroxy-3-iodophenylglycine
2-hydroxy-3-iodophenylglycine
3-hydroxy-4-iodophenylglycine
4-hydroxy-3,5-diiodophenylglycine
2-hydroxy-3,5-diiodophenylglycine
3-hydroxy-4,6-diiodophenylglycine
4-hydroxy-3,5-dibromophenylglycine
2-hydroxy-3,5-dibromophenylglycine
3-hydroxy-4,6-dibromophenylglycine
2-hydroxy-5-bromophenylglycine Appropriate water-soluble salts may be prepared from these acids in accordance with my invention.

Examples of the amino-hydroxy-phenoxy-aliphatic carboxylic acids according to my invention are:

2-dimethylamino-5-iodophenoxyacetic acid
3-amino-6-iodophenoxyacetic acid
4-diethylamino-3-iodophenoxyacetic acid
2-dimethylamino-3-iodophenoxyacetic acid
3-amino-4-iodophenoxyacetic acid
4-diethylamino-3,5-diiodophenoxyacetic acid
2-amino-3,5-diiodophenoxyacetic acid
3-dimethylamino-4,6-diiodophenoxyacetic acid
4-methylamino-3,5-dibromophenoxyacetic acid
2-amino-3,5-dibromophenoxyacetic acid
3-amino-4,6-dibromophenoxyacetic acid
2-amino-5-bromophenoxyacetic acid Appropriate water-soluble salts of these acids may be prepared by the method described above.

Examples of the amino-halo-phenylamino-aliphatic carboxylic acids in accordance with my invention are:

2-dimethylamino-5-iodophenylglycine
3-ethylamino-6-iodophenylglycine
4-amino-3-iodophenylglycine
2-diethylamino-3-iodophenylglycine
3-amino-4-iodophenylglycine
4-methylamino-3,5-diiodophenylglycine
2-dimethylamino-3,5-diiodophenylglycine
3-dimethylamino-4,6-diiodophenylglycine
4-amino-3,5-dibromophenylglycine
2-methylamino-3,5-dibromophenylglycine
3-amino-4,6-dibromophenylglycine
2-dimethylamino-5-bromophenylglycine Water-soluble salts of these acids may be prepared in accordance with the process described above.

It will be apparent to those skilled in the art that the acetic acid derivatives in the foregoing examples may be replaced by derivatives of other acids, such as the derivatives of propionic, butyric and valeric acids.

In some instances it may not be necessary to isolate a particular compound according to the invention from its isomers. Thus, if in the preparation of a particular compound isomers are formed, satisfactory results may be obtained in some instances by preparing the water-soluble salts of the mixture of isomers without resorting to extensive isolation and purification of a single chemical compound of the invention.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims.

*Example 1.—3,5-diiodo-2-hydroxyphenoxyacetic acid*

About 154 grams of p-hydroxyphenoxyacetic acid was added to two liters of a 20% solution of hydrochloric acid, with stirring. Upon warming the mixture to 78° C. the p-hydroxyphenoxyacetic acid dissolved. The solution was cooled to 45° C. and about 290 grams of iodine monochloride was added. After heating the mixture on a water bath at about 100° C. for two hours, a small amount of an aqueous solution of sodium bisulfite was added to decolorize the solution. Upon cooling the solution a precipitate formed which was removed by filtration. The filtrate was further concentrated by evaporation which produced a second crop of precipitated crystals. The resulting 3,5-diiodo-2-hydroxyphenoxyacetic acid was found to have a melting point of about 186–188° C. The neutralization equivalent found agreed very closely with the theoretical neutralization equivalent, namely, 210.

If it is desired to produce a water-soluble salt of the above acid, such as the sodium salt, the acid is dissolved in an excess of sodium hydroxide solution. The salt may be isolated by precipitation with ethyl alcohol. Other salts may be prepared by treating the acid with other alkali-metal hydroxides, such as potassium hydroxide, or with an alkylamine, such as diethylamine, or with an alkanolamine, such as diethanolamine. Other examples of alkylamines which produce the desired salts are ethylamine, diethylamine and isopropylamine. Examples of alkanolamines which produced these salts are monoethanolamine and triethanolamine.

*Examples 2.—2-hydroxy-5-iodophenoxyacetic acid*

About 110 grams of ortho-hydroxyphenoxyacetic acid was added to a liter of 20% solution of hydrochloric acid, with stirring. Upon heating the solution, the ortho-hydroxyphenoxyacetic acid dissolved. To this solution was added about 250 grams of iodine monochloride, with stirring, after which the reaction mixture was heated on a water bath for two hours at about 100° C. Upon cooling the mixture a precipitate of 2-hydroxy-5-iodophenoxyacetic acid was formed. The precipitated material was further purified by dissolving it in a small amount of water after heating the water to bring the 2-hydroxy-5-iodophenoxyacetic acid into solution, after which the solution was treated with decolorizing charcoal. The charcoal was removed by filtration and, upon cooling the solution, the purified 2-hydroxy-5-iodophenoxyacetic acid crystallized as white needles, having a melting point of 180–181° C.

*Example 3.—2-amino-5-iodophenoxyacetic acid*

About 167 grams of ortho-aminophenoxyacetic acid was added to a liter of 20% solution of hydrochloric acid, with stirring. Upon heating the solution, the ortho-aminophenoxyacetic acid dissolved. To this solution was added about 162.5 grams of iodine monochloride, with stirring, after which the reaction mixture was heated on a water bath for two hours at about 100° C. Upon cooling the mixture a precipitate of 2-amino-5-iodophenoxyacetic acid was formed. The precipitated material was further purified by dissolving it in a small amount of water after heating the water to bring the 2-amino-5-iodophenoxyacetic acid into solution, after which the solution was treated with decolorizing charcoal. The charcoal was removed by filtration and, upon cooling the solution, the purified 2-amino-5-iodophenoxyacetic acid crystallized as white needles.

*Example 4.—2-hydroxy-5-iodophenylglycine*

About 166 grams of ortho-hydroxyphenylglycine was added to a liter of 20% solution of hydrochloric acid, with stirring. Upon heating the solution, the ortho-hydroxyphenylglycine dissolved. To this solution was added about 162.5 grams of iodine monochloride, with stirring, after which the reaction mixture was heated on a water bath for two hours at about 100° C. Upon cooling the mixture a precipitate of 2-hydroxy-5-iodophenylglycine was formed. The precipitated material was further purified by dissolving it in a small amount of water after heating the water to bring the 2-hydroxy-5-iodophenylglycine into solution, after which the solution was treated with decolorizing charcoal. The charcoal was removed by filtration and, upon cooling the solution, the purified 2-hydroxy-5-iodophenylglycine crystallized as white needles.

The water-soluble products according to the invention may be dispensed as aqueous solutions for use when desired. Alternately, the dry powder may be packaged under sterile conditions to be converted to a water-soluble preparation at the time of usage by adding a requisite amount of a solution of a solubilizing agent, such as an alkali-hydroxide or an alkyl- or alkanol-amine.

The terms and expressions which I have employed are used as terms of description and not of limitation, and I have no intention, in the use of such terms and expressions, of excluding any equivalents of the features described in portions thereof, but recognize that various modifications are possible within the scope of the invention claimed.

What is claimed is:

1. A compound of the formula:

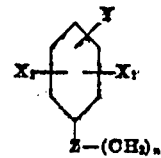

wherein $X_1$ is a member selected from the class consisting of hydrogen, iodine and bromine; $X_2$ is a member selected from the class consisting of bromine and iodine; Y is a member selected from the class consisting of the hydroxyl group, an amino group, mono- and di- lower alkyl substituted amino groups; Z is the >N—H group; $n$ is an integer from 1 to 5; and M is a member selected from the class consisting of hydrogen, the alkali-metals, the ammonium group, the alkylammonium and alkanolammonium groups.

2. A halo-hydroxy-phenylamino-alkyl carboxylic acid; said halogen being a member selected from the class consisting of bromine and iodine and said alkyl group containing not more than 5 carbon atoms.

3. A water-soluble salt of a halo-hydroxy-phenylamino-alkyl carboxylic acid; said halogen being a member selected from the class consisting of bromine and iodine and said alkyl group containing not more than 5 carbon atoms.

4. A compound selected from the class consisting of a halo-phenylglycine having one nuclear hydroxyl substituent, an a non-toxic, water-soluble salt thereof; said halogen being a member selected from the class consisting of bromine and iodine.

5. A halo-phenylaminoalkyl carboxylic acid having one nuclear hydroxyl substituent; said halogen being a member selected from the class consisting of bromine and iodine and said alkyl group containing not more than 5 carbon atoms.

6. A compound according to claim 5 in which the halogen is iodine.

7. 2-hydroxy-5-iodophenylglycine.

8. A polyiodo-hydroxy-phenylamino-alkyl carboxylic acid; said alkyl group containing not more than 5 carbon atoms.

9. Halo-hydroxy-phenylglycine; said halogen being a member selected from the class consisting of bromine and iodine.

10. A water-soluble salt of a halo-hydroxy-phenylglycine in which the halogen is a member selected from the class consisting of bromine and iodine.

11. A halo-amino-phenylglycine; said halogen being a member of the class consisting of bromine and iodine.

12. A water-soluble salt of a halo-amino-phenylglycine in which the halogen is a member selected from the class consisting of bromine and iodine.

References Cited in the file of this patent

UNITED STATES PATENTS

| 2,085,009 | Dalmer et al. | June 29, 1937 |
| 2,571,515 | Archer | Oct. 16, 1951 |

FOREIGN PATENTS

| 514,103 | Great Britain | Oct. 13, 1939 |

OTHER REFERENCES

Beilstein: Band VI (4th Ed.), 1923, pp. 784–5.
Long et al.: J. A. C. S., vol. 63, pp. 1586–9 (1941).
Frieden et al.: J. A. C. S., vol. 70, p. 3511 (1948).
Wolfe et al.: J. Org. Chem. 14, 900–1 (1949).
Wang: J. Org. Chem. 84, 1271–4 (1951).
Holley: Arch Biochem. Biophys. 35, 171–5 (1952).